Jan. 28, 1930. G. H. DYER 1,745,154
PISTON
Filed June 13, 1928
Fig.1.
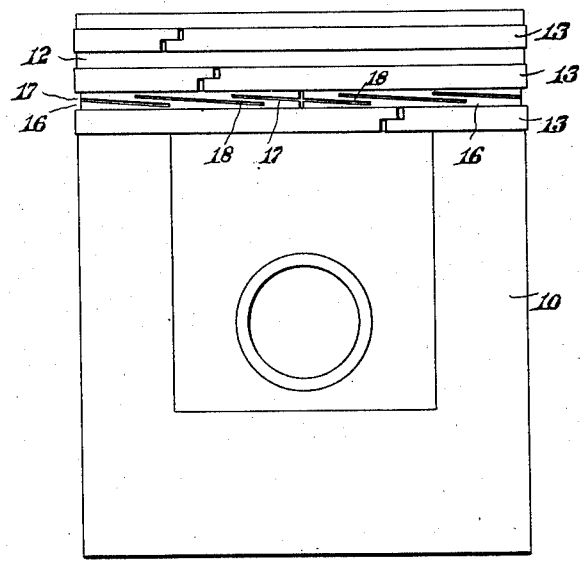
Fig.2.
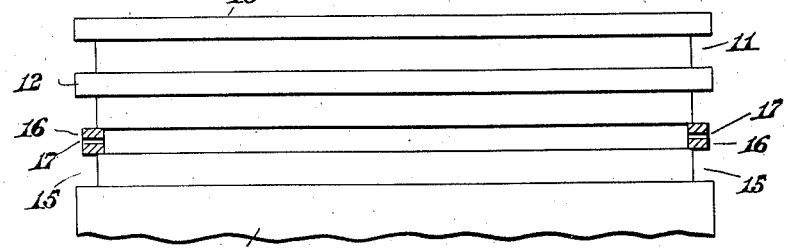
Fig.3.
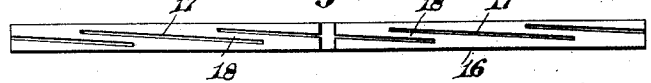
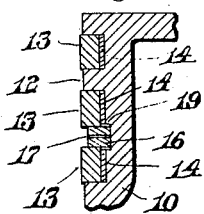
Fig.4.
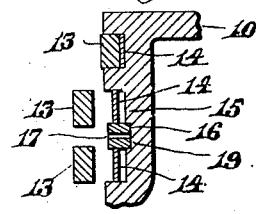
Fig.5.
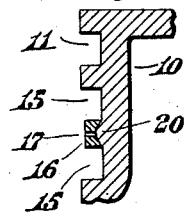
Fig.6.
Inventor:
George H. Dyer,
by Walter E. Lombard.
Atty.

Patented Jan. 28, 1930

1,745,154

UNITED STATES PATENT OFFICE

GEORGE H. DYER, OF CAMBRIDGE, MASSACHUSETTS

PISTON

Application filed June 13, 1928. Serial No. 285,103.

This invention relates to pistons for motors, the object of the invention being the production of a device of this character in which a land between two adjacent piston rings is expansible axially and adapted to separate said rings and force them into contact with oppositely disposed walls of a groove of said piston in which said rings are mounted and thereby prevent leakage when the piston is operating.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation of a piston embodying the principles of the present invention and showing packing rings in the peripheral grooves thereof.

Figure 2 represents an elevation of the upper end thereof with the packing rings removed.

Figure 3 represents an elevation of a removable separator forming a land between two rings.

Figure 4 represents an enlarged section of one side of the piston, with packing rings installed.

Figure 5 represents a similar view with sections of the rings in position ready to be installed, and Figure 6 represents a similar view without the packing rings and showing a modified form of mounting the separator on the piston.

Similar characters indicate like parts throughout the several figures of the drawing.

In the drawings, 10 is a piston which may be of any well known construction except as hereinafter pointed out.

Usually pistons are formed with three annular recesses in the periphery thereof such as the recess 11 and between these recesses 11 are lands such as the land 12 shown in Figs. 2, 4, 5 and 6.

These lands 12 have been formed integral with the piston 10 and the recesses 11 have had split packing rings 13 disposed therein with expanders 14 between the bottom of the recess and the inner wall of the packing ring.

In some cases the rings 13 have been made with overlapping slots extending therethrough and in other cases without such slots.

Where the rings are made with overlapping slots they do not have a good wearing surface where they contact with the wall of the piston chamber and consequently it is of advantage to have all the split rings of solid material.

In order to provide means whereby solid split rings may be used and yet be sufficiently tight to prevent leakage is the object of this invention.

Consequently only one recess 11 is provided near the end of the piston 10 and in this recess is disposed an ordinary split packing ring 13 and its expander 14.

Beneath this recess 11 is a wide recess 15, the width of which is sufficient to receive two packing rings 13 and a separating land 16 between them.

In the present instance this separating land 16 is not made integral with the piston but is an annular member provided with a plurality of overlapping slots 17 extending therethrough, the two opposite sides being connected by resilient portions 18, all as shown in Fig. 3.

The land 16 is normally fully expanded as indicated in Fig. 5 and its inner portion is disposed preferably in a narrow groove 19 midway the width of the recess 15 although the land 16 may have a depression in its inner face into which may extend an annular projection 20 formed on the piston 10 as shown in Fig. 6.

The ring 16 is made of spring metal and when installed on the piston 10 it must be compressed to permit the installation of the packing rings 13 and expanders 14.

When both rings 13 are installed the expansion of the land 16 will separate the two rings 13 and force them against the opposed walls of the recess 15 thereby preventing leakage past said rings.

This makes a very effective piston which is always provided with expanding means for retaining the packing rings in sealing contact with the walls of the recess in which they are mounted, thus reducing leakage to a minimum.

Having thus described my invention, I claim:

1. A piston provided with a wide annular recess in its periphery adapted to receive two rings expansible radially; and a narrow annular land centrally retained in said recess and expandible axially.

2. A piston provided with a wide annular recess in its periphery with a narrow groove midway its width; and a narrow land partially disposed in said groove and extending therefrom, said land being expandible axially.

3. A piston provided with a wide annular recess in its periphery and having locked thereto midway the width of said recess, a split land having a plurality of overlapping slots extending therethrough and expandible axially.

4. A piston provided with a wide annular recess in its periphery adapted to receive two split packing rings; and expansible means between said rings locked to said piston and adapted to force said rings agaist the walls of said recess.

5. A piston provided with a wide annular recess in its periphery adapted to receive two split packing rings and means for expanding said rings radially; and expansible means between said rings locked to said piston and adapted to force said rings against the walls of said recess, said expansible means having a diameter less than that of said piston.

Signed by me at 294 Washington St., Boston, Massachusetts, this 7th day of June, 1928.

GEORGE H. DYER.